United States Patent [19]
Ayerst et al.

[11] Patent Number: 5,689,805
[45] Date of Patent: Nov. 18, 1997

[54] COMMUNICATION SYSTEM AND METHOD PROVIDING MINIMUM MESSAGE TRANSMISSION DELAY

[75] Inventors: Douglas I. Ayerst, Delray Beach; William Joseph Kuznicki, Coral Springs; Robert John Schwendeman, Pompano Beach, all of Fla.

[73] Assignee: Motorola, Inc., Schaumburg, Ill.

[21] Appl. No.: 541,842

[22] Filed: Oct. 10, 1995

[51] Int. Cl.$^6$ ........................................ H04Q 7/26
[52] U.S. Cl. ................ 455/33.1; 455/51.2; 455/54.2
[58] Field of Search ...................... 455/33.1, 51.2, 455/53.1, 54.1, 54.2, 56.1, 343, 38.3, 32.1, 38.1; 379/59, 60, 63; 340/825.44, 311.1; 370/95.1, 95.3, 94.1, 69.1, 312, 313

[56] References Cited

U.S. PATENT DOCUMENTS

| | | |
|---|---|---|
| 4,918,437 | 4/1990 | Jasinski et al. |
| 4,968,966 | 11/1990 | Jasinski et al. |
| 5,153,902 | 10/1992 | Buhl et al. .............. 379/60 |
| 5,162,790 | 11/1992 | Jasinski et al. |
| 5,241,542 | 8/1993 | Natarajan et al. .............. 455/54.1 |
| 5,475,863 | 12/1995 | Simpson et al. .............. 455/54.1 |

*Primary Examiner*—Nguyen T. Vo
*Attorney, Agent, or Firm*—Philip P. Macnak

[57] ABSTRACT

A communication system (100) providing minimum transmission delay for message delivery to communication transceivers (510) includes a plurality of transmission cells (102, 104) which include one or more receivers (512) and a transmitter (506) and which define geographical transmission areas. The transmitter (506) transmits an address identifying the communication transceiver (510) for which a message is intended and a color code identifying the transmitter (506) during a first scheduled transmission time interval (212). At least one receiver (512) located within the transmission cells (102, 104) receives an acknowledgment including the address and color code generated by the communication transceiver (510) during a second scheduled transmission time interval (216). The transmitter (506) identified by the color code transmits the address and message during a scheduled message transmission frame (110) designated by the color code during a third time interval, during which time the address and message are received by the communication transceiver (510).

21 Claims, 11 Drawing Sheets

510

COMMUNICATION SYSTEM AND METHOD PROVIDING MINIMUM MESSAGE TRANSMISSION DELAY

BACKGROUND OF THE INVENTION

This invention relates in general to communication systems which deliver messages to communication transceivers, and in particular to a communication system which provides minimum transmission delay for message delivery to the communication transceivers.

Communication systems, especially simulcast transmission communication systems have been used for many years for delivering analog and digitally encoded messages, and more recently for delivering numeric and relatively short alphanumeric paging and data messages. The delivery of long alphanumeric paging messages has been hampered in part by a lack of suitable high speed message transmission protocols and in part by the use of simulcast transmission systems which placed an upper limit on the data rate at which messages can be delivered.

One solution to the problem of transmitting long alphanumeric paging messages was described in U.S. Pat. No. 4,918,437 issued Apr. 17, 1990 to Jasinski et al. As described in Jasinski et al., address signals were simulcast transmitted at a first, low data bit rate to enable reliable addressing of communication transceivers to which messages were directed. Once the address was received, the communication transceivers provided an acknowledge back signal allowing the communication transceivers within the transmission cells of the simulcast transmission system to be located. Once the communication transceivers were located, non-simulcast message transmissions at a second, higher data bit rate were provided from those transmitters within the transmission cells in which the communication transceivers were located. Non-simulcast message transmissions within adjacent transmission cells were coordinated so as to preclude simultaneous transmission of different messages within adjacent transmission cells, in one instance, and of limited simulcast transmissions of the same messages within several adjacent transmission cells. While such operation as described above proved to be an effective method for transmitting long alphanumeric paging messages, it will be appreciated that there were delays which were encountered in message delivery, as the message transmissions within adjacent transmission cells had to be coordinated and alternated in time. Because the reception of the message transmissions was not coordinated with the communication transceivers, it would also be appreciated that a somewhat reduced battery life would result, as the communication transceivers were of necessity receiving all message transmissions during each alternating transmission time interval.

Other prior art systems have attempted to resolve the aforementioned problem by utilizing frequency re-use between adjacent transmission cells. While such frequency re-use enabled different messages to be simultaneously transmitted within adjacent transmission cells, a delay in such message transmission was necessary to properly direct each of the communication transceivers which were located within each of the transmission cells to an appropriate re-use frequency for receiving the messages within the transmission cell in which the communication receivers were located. As a result, it would be appreciated that additional delay and a somewhat reduced battery life would still occur.

Thus what is needed is a system and method for minimizing the transmission delay encountered in delivering messages to communication transceivers within the transmission cells of a simulcast communication system in which the communication transceivers were located. Furthermore, what is needed is a system and method for minimizing the transmission delay encountered in delivering messages to communication transceivers using frequency re-use. Furthermore, what is needed is a system and method for minimizing the transmission delay encountered in delivering the messages to communication transceivers by using a multiplicity of frequency re-use channels coordinated with scheduled message transmission frames thereby maximizing the battery life of the communication transceivers.

SUMMARY OF THE INVENTION

An aspect of the present invention is a method for providing minimum transmission delay for delivery of a message in a communication system which comprises a plurality of transmission cells which include one or more cell receivers and a cell transmitter and which define geographical transmission areas. The method comprises the step of transmitting during a first scheduled time interval, from the cell transmitter located within the plurality of transmission cells, an address identifying a communication transceiver for which a message is intended and a color code signal identifying the cell transmitter. The method further includes the step of receiving during a second scheduled time interval, by at least one of said one or more cell receivers located within the plurality of transmission cells, an acknowledgment signal generated by the communication transceiver for which a message is intended, the acknowledgment signal including the color code signal identifying the cell transmitter transmitting the address. The method also includes the step of transmitting, from the cell transmitter identified by the color code signal, during a third time interval including a predetermined sequence of scheduled message transmission frames, the address identifying the communication transceiver for which a message is intended and the message during a selected one of a predetermined sequence of message transmission frames designated by the color code signal. The method also includes the step of receiving, by the communication transceiver during the selected one of a predetermined sequence of message transmission frames, the address identifying the communication transceiver for which the message is intended and the message transmitted by the cell transmitter identified.

Another aspect of the present invention is a communication system which provides minimum transmission delay for delivery of a message. The communication system comprises a communication transceiver and a plurality of transmission cells which include one or more cell receivers and a cell transmitter, and which define geographical transmission areas. The cell transmitter is located within each of the plurality of transmission cells, and transmits during a first scheduled transmission time interval an address identifying the communication transceiver for which a message is intended and a color code signal identifying the cell transmitter. The communication transceiver is responsive to the address and the color code signal which is received during the first scheduled transmission time interval, for generating and transmitting during a second scheduled transmission time interval an acknowledgment signal which includes the address and the color code signal identifying the cell transmitter. The at least one of the one or more cell receivers is located within the plurality of transmission cells to receive during the second scheduled transmission time interval the acknowledgment signal which includes the color code signal identifying the cell transmitter transmitting the address. The cell transmitter identified by the color code signal further transmits, during a third time interval including a predetermined sequence of scheduled message transmission frames, the address identifying the communication transceiver for which the message is intended and the message during one of a predetermined sequence of message transmission frames designated by the color code signal, and the communication transceiver further receives the address identifying the communication transceiver for which the message is intended and the message transmitted by the cell transmitter during the one of the predetermined sequence of message transmission frames designated by the color code signal.

A third aspect of the present invention is a communication transceiver for use in a communication system which provides minimum transmission delay for delivery of a message. The communication transceiver comprises a receiver, a transmitter, a memory and a controller. The receiver receives during a first scheduled transmission time interval an address identifying a communication transceiver for which a message is intended, and a color code signal identifying a cell transmitter which transmits the message. The transmitter transmits during a second scheduled transmission time interval an acknowledgment signal including the address identifying the communication transceiver for which a message is intended, and the color code signal received identifying the cell transmitter. The memory stores a table of predetermined color code signals and message transmission frames associated therewith, and the controller is responsive to the color code signal received for selecting from the table of predetermined color code signals a transmission frame associated with the color code signal received. The receiver is further responsive to the controller for receiving the address identifying the communication transceiver to which a message is intended and message during the transmission frame associated with the color code signal received.

A fourth aspect of the present invention is a method for transmitting messages to a communication transceiver operating within a communication system which comprises a plurality of transmission cells defining geographical transmission areas and which include a transmitter assigned a transmitter ID identifying the transmitter and one or more receivers for receiving an acknowledgment signal generated by the communication transceiver. The method comprises the step of transmitting, during a first scheduled transmission time interval, within the plurality of transmission cells an address identifying the communication transceiver for which a message is intended and the transmitter ID identifying the transmitter transmitting the address. The method further includes the step of receiving by the communication transceiver the address and the transmitter ID of the transmitter transmitting the address and in response thereto transmitting the acknowledgment signal which includes the address of the communication transceiver and the transmitter ID received, during a second scheduled transmission time interval. The method further includes the step of selecting from a table of transmitter IDs and associated predetermined message transmission frames stored within the communication transceiver. The method further includes the steps of receiving the acknowledgment signal by at least one of the one or more receivers located within one or more of the plurality of transmission cells, comparing the transmitter ID received with the table of predetermined transmitter IDs identifying the transmitter and identifying therefrom the transmitter from which the address was transmitted, and transmitting from the transmitter identified, during a third time interval including a predetermined sequence of scheduled message transmission frames, the address and the message during a selected one of the predetermined sequence of scheduled message transmission frames associated with the transmitter ID received. The method further includes the step of receiving by the communication transceiver the address and message which is transmitted during the selected one of the predetermined sequence of scheduled message transmission frames.

DESCRIPTION OF THE PREFERRED EMBODIMENTS

Figure 1:
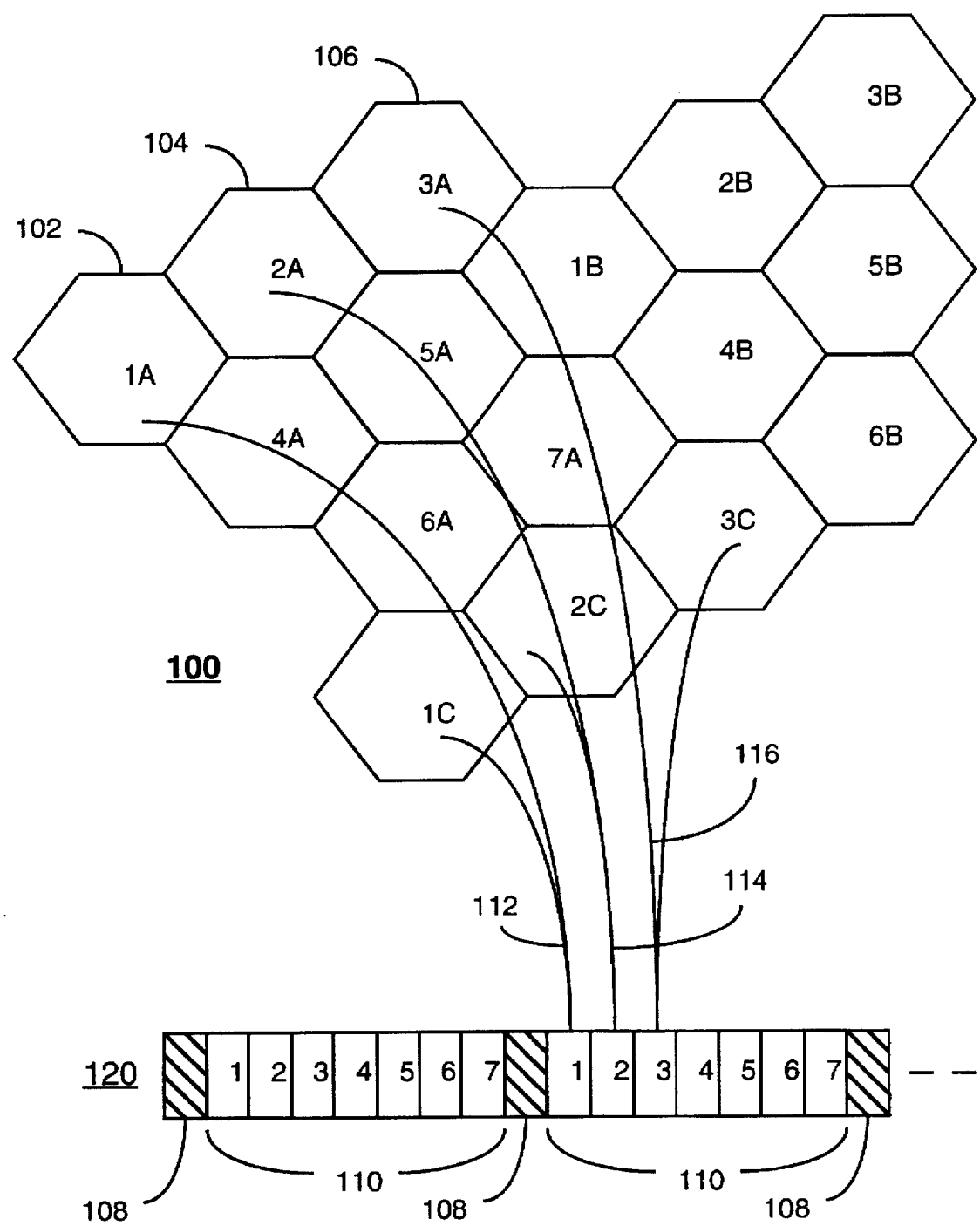
FIG. 1 is a composite diagram depicting a communication system and associated communication protocol which provides minimum transmission delay for message delivery to a communication transceiver in accordance with the present invention.

FIG. 1 is a composite diagram depicting a communication system 100 and associated communication protocol 120 which provides minimum transmission delay for message delivery to a communication transceiver in accordance with the present invention. The communication system 100 comprises a plurality of transmission cells, shown as transmission cell 102, transmission cell 104 and transmission cell 106 which define geographical transmission areas within a simulcast communication system, such as is well known to one of ordinary skill in the art. Each of the plurality of transmission cells includes one or more cell receivers and a cell transmitter, as will be described in detail below. The communication protocol 120 includes a control frame 108 followed by a plurality of message transmission frames 110 which are labeled by way of example 1–7. The control frame 108 and message transmission frames 110 will be described in further detail below. As shown in FIG. 1, the communication system 100 is organized to provide frequency re-use, and by way of example a seven-cell frequency re-use pattern (cells 1A–7A, 1B–7B, etc.) is shown, although it will be appreciated that other frequency re-use pattern providing more or less cells can be utilized as well. During the frequency re-use portion of the communication protocol 120, message transmissions occur in a predetermined sequence, i.e. during a first transmission frame 112 in transmission cells 1A, 1B, 1C, etc., during a second transmission frame 114 in transmission cells 2A, 2B, 2C, etc., during a third transmission frame 116 in transmission cells 3A, 3B, 3C, etc., and so forth. It will be appreciated from the description provided above, that when the number of transmission cells within the cell frequency re-use pattern is increased, there is a corresponding increase in the number of message transmission frames 110 provided, and likewise, when the number of transmission cells within the cell frequency re-use pattern is decreased, there is a corresponding decrease in the number of message transmission frames provided, as will be described in further detail below.

In summary, the communication protocol 120 provides a predetermined transmission sequence which allows for the transmission of messages directed to communication transceivers operating within the transmission cells without the problems inherent to simulcast transmission. The communication protocol 120 includes a control frame which is simulcast transmitted from all cell transmitters within the communication system 100, and which is followed by a plurality of message transmission frames which are transmitted as non-simulcast transmissions in a predetermined sequence from each of the cell transmitters.

Figure 2:
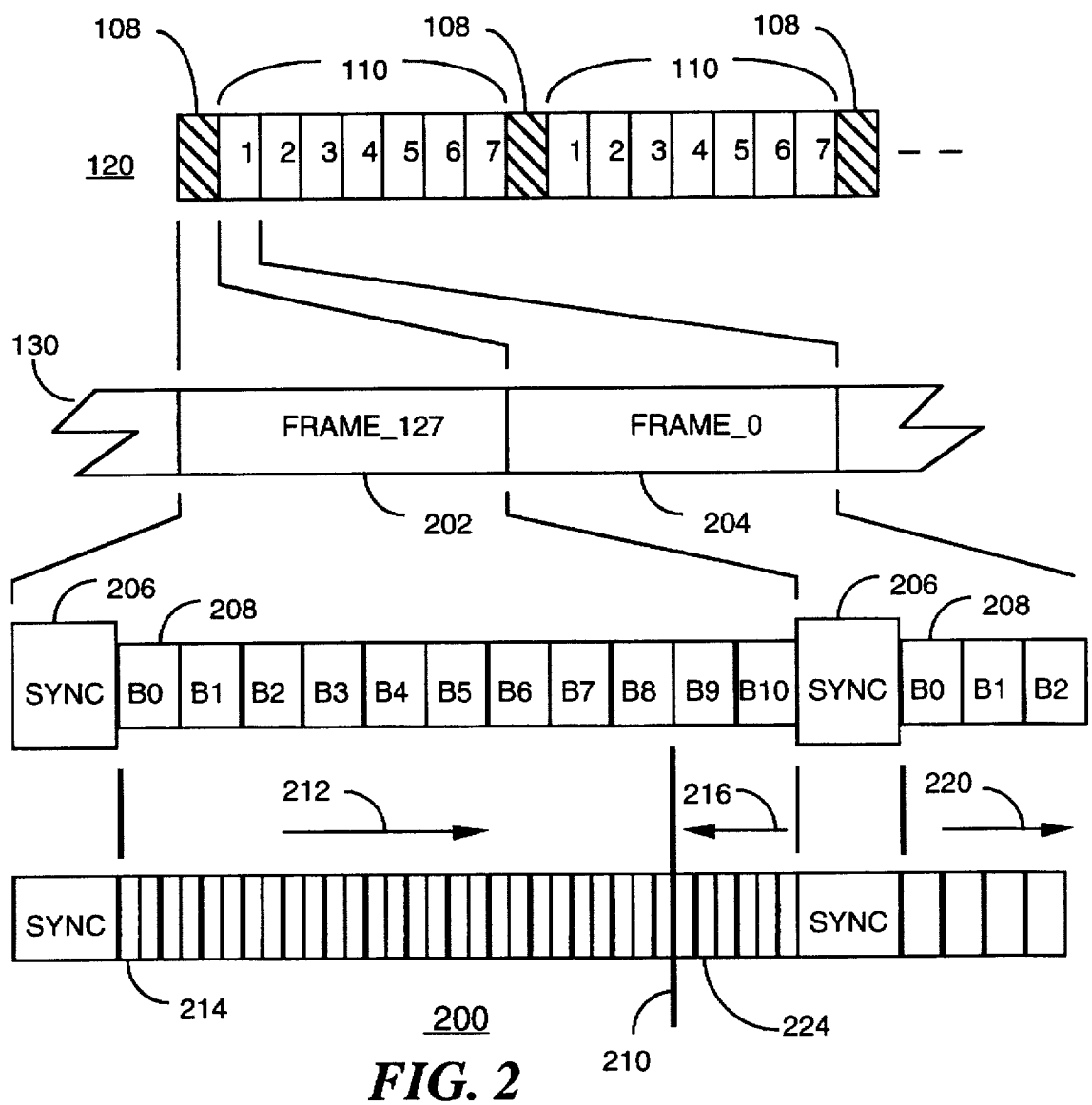
FIG. 2 is a signaling diagram illustrating the communication protocol of FIG. 1 in accordance with a first embodiment of the present invention.

FIG. 2 is a signaling diagram illustrating the communication protocol 120 of FIG. 1 in accordance with a first embodiment of the present invention. The control frame 108 and message transmission frames 110 correspond to frames 202, 204, etc. of a synchronous signaling protocol 130, such as the FLEX™ signaling protocol. The FLEX signaling protocol is described herein by way of example, and it will be appreciated that other synchronous signaling protocols can be utilized as well to provide minimum transmission delay for message delivery to a communication transceiver in accordance with the present invention.

The synchronous signaling protocol 130 includes by way of example one hundred and twenty eight frames numbered frame_0 204 through frame_127 202. Any of the one hundred and twenty eight frames can be designated as a control frame 108 and message transmission frames 110, however, it will be appreciated that the designation is generally dictated by the number of transmission cells within the cell frequency re-use pattern. For the seven cell re-use pattern illustrated in FIG. 1, one control frame 108 and seven message transmission frames 110 would be sequentially repeated sixteen times within the one hundred and twenty eight frames of the synchronous signaling protocol 130.

In the first embodiment of the present invention, a portion of the control frame 108 provides control information which is directed to communication transceivers operating within the communication system, and which is transmitted during an outbound transmission time interval 212. A second portion of the control frame 108 is used to receive acknowledge back responses generated by the communication transceivers during an inbound transmission time interval 216. The acknowledge back responses are used for locating the communication transceivers, as will be described in detail below. The information transmitted during the outbound transmission time interval 212 and the inbound transmission time interval 216 is transmitted on a single RF channel, or frequency, thus providing a time division duplex (TDD) arrangement for outbound and inbound information on the channel. Once the communication transceivers have been located, messages directed to the communication transceivers are transmitted during the ensuing message transmission frames 110. While only a single control frame 108 is shown, it will be appreciated that several control frames can be transmitted in a sequence depending upon channel loading, thereby increasing the outbound channel throughput which is used for locating the communication transceivers for which messages are directed.

Frames 202, 204, etc. include by way of example a synchronization portion 206 followed by eleven transmission blocks 208 (identified as B0 through B10). The boundary 210 between the outbound transmission time interval 212 and the inbound transmission time interval 216 is defined as the boundary between two transmission blocks, one providing outbound message transmission and one providing a start of the inbound message transmission, respectively. In one embodiment of the present invention, the boundary 210 is fixed thereby providing a predetermined number of transmission time slots available for outbound message transmissions, and a predetermined number of transmission time slots available for inbound message transmissions. In a second embodiment of the present invention, the boundary 210 is variable thereby providing a variable number of transmission time slots available for outbound message transmissions, and a variable number of transmission time slots code words available for inbound message transmissions as will be described further below.

In addition to the boundary 210 between outbound and inbound message transmissions, a second boundary 222 can be provided which delineates a boundary between transmission time slots provided for scheduled acknowledge back responses, or scheduled acknowledge back response time slots 218 and transmission time slots provided for unscheduled acknowledge back responses, or unscheduled acknowledge back response time slots 224. Scheduled acknowledge back responses are those responses which are generated by the communication transceivers in response to being addressed during the outbound transmission time interval 212 of the control frame 108. Unscheduled acknowledge back responses are those responses generated by a communication transceiver which has not been addressed as described above, but rather which are generated by the communication transceiver so as to obtain a scheduled inbound transmission time interval during which information can be delivered from the communication transceiver to the communication system. When unscheduled acknowledge back responses are provided, the number of unscheduled acknowledge back response time slots 224 provided are generally limited, are positioned at the end of the inbound transmission time interval 216, and the number of unscheduled acknowledge back response time slots 224 are generally predefined within the communication transceivers, although it will be appreciated that the number can also be changed when the communication transceiver has the capability to be reprogrammed over-the-air.

Each of the transmission blocks 208 transmitted within the control frame 108 are transmitted within the outbound transmission time interval 212 and comprise by way of example eight code words 214 which represent either address code words, vector code words, data code words or idle code words, while each of the transmission blocks 208 transmitted within the inbound transmission time interval 216 also comprise by way of example eight code words which represent acknowledge back responses and which include address code words identifying the communication transceiver responding, and data code words providing transmitter IDs, or color codes, as will be described in further detail below. Each of the transmission blocks 208 which are transmitted within the outbound data transmission 220 in message transmission frames 110 also comprise by way of example eight code words and represent address code words and data code words and are only transmitted within the transmission cells in which the communication transceivers are located, as described above.

As described above, the communication protocol 120 includes a control frame 108 which is transmitted in a simulcast transmission from all cell transmitters within the communication system 100, followed by a predetermined sequence of message transmission frames 110 which are transmitted in a non-simulcast transmission by the cell transmitters of the communication system 100 transmitting in a predetermined sequence as described above. In operation, it will be appreciated that messages intended for communication transceivers do not immediately follow the transmission of the control frame 108, but rather the messages transmitted during the message transmission frames 110 immediately following the control frame 108 transmission are generally messages intended for communication transceivers which were located during a previous control frame 108 transmission, as will be explained in further detail below.

Figure 3:
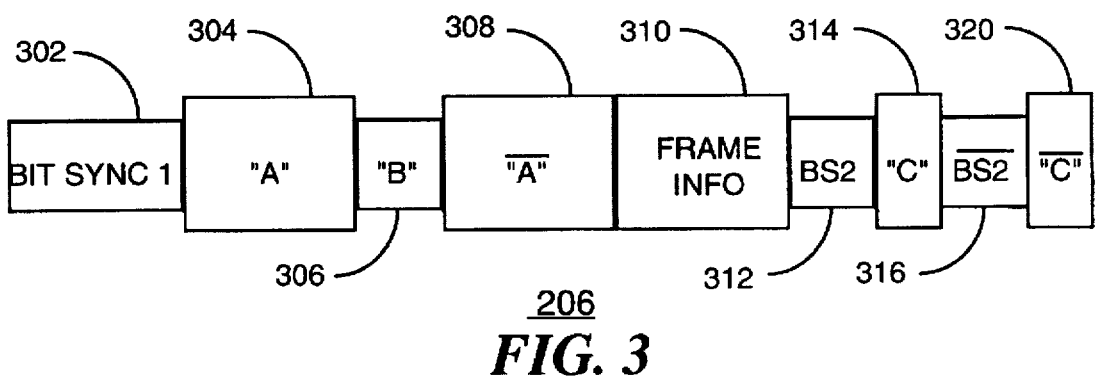
FIG. 3 is a signaling diagram illustrating the synchronization code word 206 utilized in the communication protocol of FIG. 2.

FIG. 3 is a signaling diagram of the synchronization code word 206 utilized in the communication protocol of FIG. 2. The synchronization code word 206 includes two portions, a first sync portion or sync "1" and a second sync portion or sync "2". Sync "1" comprises a bit sync "1" code word 302, an "A" code word 304, a "B" code word 306 and an "A" bar code word 308. Sync 2 comprises a bit sync "2" code word 312, a "C" code word 314, a bit sync "2" bar code word 316 and a "C" bar code word 320. Sync "1" is transmitted preferably at 1600 bits per second and provides a means for obtaining frame timing, and also provides the transmitter ID, or color code, as will be described in further detail below. Sync 1 can also provide information designating the frame block speed, or bit rate at which the rest of the frame is transmitted. The frame info word 310 is also transmitted preferably at 1600 bits per second and carries a frame, a cycle number and other information. Sync "2" provides synchronization at the frame block speed designated by sync "1".

The transmitter ID described above is provided by way of example by information delivered in the "B" code word 306 which is a sixteen bit code word encoded using a 16,5 Bose, Chaudhuri, Hocquernghem (BCH) encoding format. To reduce the possibility of false transmitter identification, only a subset of one hundred and twenty-eight predetermined code words of the possible BCH code words are utilized to provide transmitter IDs, or color codes. Additional information on the general use of color codes is found in U.S. patent application Ser. No. 08/131,243 filed Oct. 4, 1993 by Simpson et al., entitled "Method and Apparatus for Identifying a Transmitter in a radio Communication System" which is assigned to the assignee of the present invention, and which is incorporated by reference herein.

Figure 4:
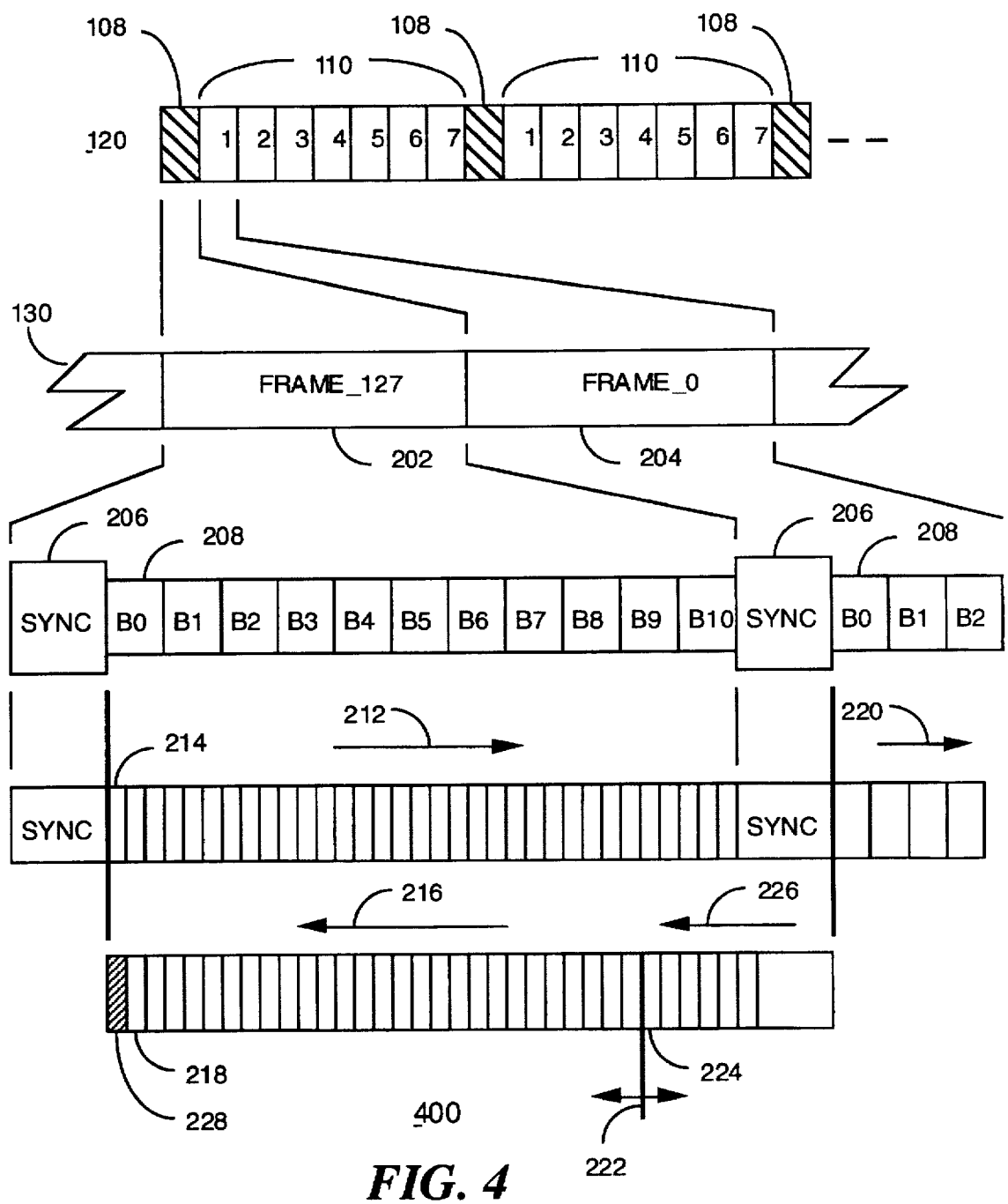
FIG. 4 is a signaling diagram illustrating the communication protocol of FIG. 1 in accordance with a second embodiment of the present invention.

FIG. 4 is a signaling diagram illustrates the communication protocol of FIG. 1 in accordance with a second embodiment of the present invention. As described above in FIG. 2, outbound transmissions and inbound transmissions are time division duplexed onto a single RF channel or frequency. In the second embodiment of the present invention shown in FIG. 4, separate RF channels or frequencies are used for outbound transmissions and for inbound transmissions utilizing well known frequency division multiplexing (FDM) techniques. As shown in FIG. 4, the outbound RF channel transmission is depicted as outbound transmission time interval 212, while the inbound RF channel transmission is depicted as inbound transmission time interval 216. When code words 214 are transmitted which represent a sequence of communication transceiver addresses for which messages are intended, there is a delay time interval 228, as is well known to one of ordinary skill in the art, after which code words representing a sequence of acknowledge back responses 218 are received. It will be appreciated that there is, as a result, a predetermined correspondence between when a communication transceiver address is transmitted on the outbound RF channel, and when an acknowledge back response is received from the communication transceiver on the inbound RF channel. The communication protocol of FIG. 1 in accordance with a second embodiment of the present invention also differs from that described above for FIG. 2 in that the boundary 210 does not exist. Only the boundary 222 between scheduled acknowledge back response time slots 218 and unscheduled acknowledge back response time slots 224 is present when unscheduled acknowledge back response time slots 224 are provided within the communication system 100. All other aspects of the operation of the communication protocol of FIG. 1 in accordance with the second embodiment of the present invention is as described for FIG. 2 above.

In summary, two embodiments of a communication protocol are described above which can be utilized in accordance with the present invention to deliver messages to communication transceivers. In a first simulcast outbound transmission, transmitters are identified by a color code which is preferably located within the synchronization portion of communication protocol 200 or communication protocol 400, after which addresses identifying communication transceivers to which messages are intended are transmitted within a control frame 108 as described above. Those communication transceivers to which messages are intended are then able to identify the transmitter from which the address is transmitted and to provide an acknowledge back response which includes their address and the color code of the transmitter from which the address transmission is received. The received acknowledge back responses are then processed to identify the transmission cells in which the communication transceivers are located after which addresses and messages are then delivered to the communication transceivers in non-simulcast outbound transmissions during the appropriate transmission frame which corresponds to the transmission cells in which the communication transceivers were located.

Figure 5:
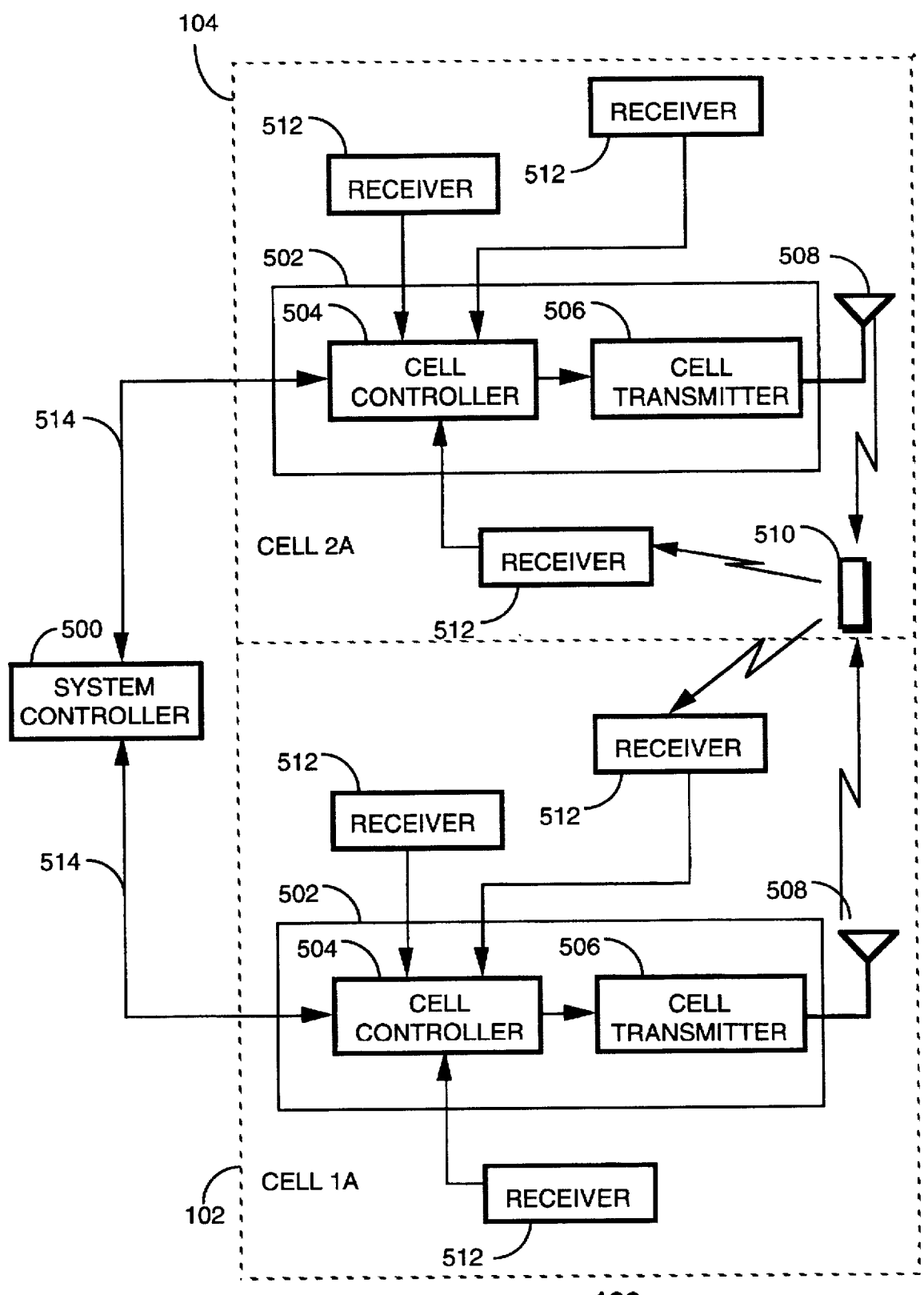
FIG. 5 is an electrical block diagram of the communication system of FIG. 1 in accordance with the present invention.

FIG. 5 is an electrical block diagram of the communication system 100 of FIG. 1 in accordance with the present invention. The communication system 100 includes a system controller 500 which receives message inputs from message originators such as through the use of the public switched telephone network (PSTN), in a manner well known to one of ordinary skill in the art. The messages are processed in a manner to be described below, prior to distribution of the messages to a plurality of base stations 502, of which two base stations 502 are shown by way of example in transmission cell 102 and transmission cell 104, and which are designated as Cell 1A and Cell 2A, respectively. The distribution of the messages between the system controller 500 and the base stations 502 is accomplished using a well known message distribution system 514, such as a direct wireline (telephone) link, a data communication link, or any of a number of radio frequency links, such as an RF link transmitter/link receivers, a microwave transmission link or a satellite transmission link, just to name a few.

The base stations 502 include a cell controller 504 having an input coupled to the message distribution system 514 and an output coupled to the input of a cell transmitter 506. The output of the cell transmitter 506 couples to an antenna 508. The outputs of one or more cell receivers 512, three of which are shown by way of example in each transmission cell 102, 104, are coupled to receiver inputs of the cell controller. Messages distributed from the system controller 500 over the message distribution system 514 are received at the input of the cell controller 504, which then stores the messages. At an appropriate time as described above, the addresses of a communication transceiver 510 for which messages are directed are recovered from memory and are processed to add a transmitter ID, or color code identifying the transmitter 506 which will then be transmitting the addresses within each transmission cell 102, 104. Each transmitter within the communication system 100 is identified with a unique transmitter ID, or color code. In the preferred embodiment of the present invention, there are one hundred and twenty-eight unique transmitter ID's allowing up to one hundred and twenty-eight transmitters within a given geographic area to be uniquely identified. The addresses and color codes identifying the transmitters transmitting the messages are coupled to the input of cell transmitter 506 which then transmits the addresses and color codes in a manner well known to one of ordinary skill in the art. The addresses and color codes transmitted are received by communication transceivers 510 within the transmission cells, of which one communication transceiver 510 is shown by way of example. When one of the addresses transmitted is the same as a predetermined address assigned to the communication transceiver 510, the color code of the transmitter transmitting the message is received and stored by the communication transceiver 510.

Following the reception of the address identifying the communication transceiver, the communication transceiver generates an acknowledge back response which includes the address and color code identifying the transmitter which transmitted the address, thereby locating in which transmission cell 102, 104 the communication transceiver 510 is located. As shown in FIG. 5, the communication transceiver 510 can, potentially receive the address and color code transmitted from the transmitter in transmission cell 102 or transmission cell 104. While cell transmitter 506 in transmission cell 102 is transmitting a different color code as compared to the cell transmitter 506 of transmission cell 104, normally the transmission from one of the transmitters captures the communication transceiver 510, thus only the color code of the transmitter having the strongest signal is received. In those instances where the signal strength from both the cell transmitter 506 in transmission cell 102 and transmission cell 104 are substantially identical, the address and both color codes are received. One attribute of the one hundred and twenty-eight unique color codes is that the code words are orthogonal, such that when several color codes are simultaneously received, the color codes of both transmitters can be individually identified in a manner well known to one of ordinary skill in the art. In such an instance, the communication transceiver 510 would select the color code of one of the two transmitters, according to a predetermined selection criteria, for transmission in the acknowledge back response as described above.

The acknowledge back response transmission can be received by one or more cell receivers 512 located within one or more transmission cells depending upon the location of the communication transceiver 510. Irrespective of the number of cell receivers 512 receiving the acknowledge back response, the communication transceiver 510 address and color code received within the acknowledge back responses are forwarded to the cell controllers 504 of the respective cell receivers. As previously described above, the color code not only identifies which transmitter transmitted the address, but also identifies as will be described below in which message transmission frames 110 the actual message will be delivered to the communication transceiver 510. Likewise, by identifying the color code, as described above, the communication transceiver 510 also knows in which message transmission frames 110 the message will be delivered. By eliminating the need for any further transmission of information between the base station 502 and the communication transceiver 510 the transmission delay for message delivery to the communication transceiver 510 is minimized in accordance with the present invention. Likewise, because the message transmission frames 110 are also identified in the manner described above, the communication transceiver 510 can battery save during those message transmission frames 110 in which the message will not be delivered.

In summary, during a first portion of the control frame 108 which represents a first scheduled transmission time interval and which by way of example corresponds to the outbound transmission time interval 212 of frame_127 202 of FIG. 2, an address identifying a communication transceiver 510 for which a message is intended is simulcast transmitted together with a color code signal identifying the base station 502 from which the address transmission occurred. During a second portion of the control frame 108 which represents a second scheduled time interval and which by way of example corresponds to the inbound transmission time interval 216 of frame_127 202, acknowledge back responses are received by at least one cell receiver 512 of the one or more cell receivers located within the plurality of transmission cells. The acknowledge back response includes the color code signal identifying the base station 502 transmitting the address which was received by the communication transceiver 510. Once the communication transceiver 510 is located, the cell transmitter 506 identified by the color code signal received by the at least one cell receiver 512 of the one or more cell receivers transmits the address identifying the communication transceiver 510 for which a message is intended and the message. The address and message are transmitted during a selected one of a plurality of scheduled message transmission frames designated by the color code signal identifying the base station 502. The communication transceiver 510 also receives the address and message during the selected one of a plurality of scheduled message transmission frames. The address and message transmission is made without any additional communication between the base station 502 and the communication transceiver 510, thereby minimizing the transmission delay for message delivery to the communication transceiver 510.

Figure 6:
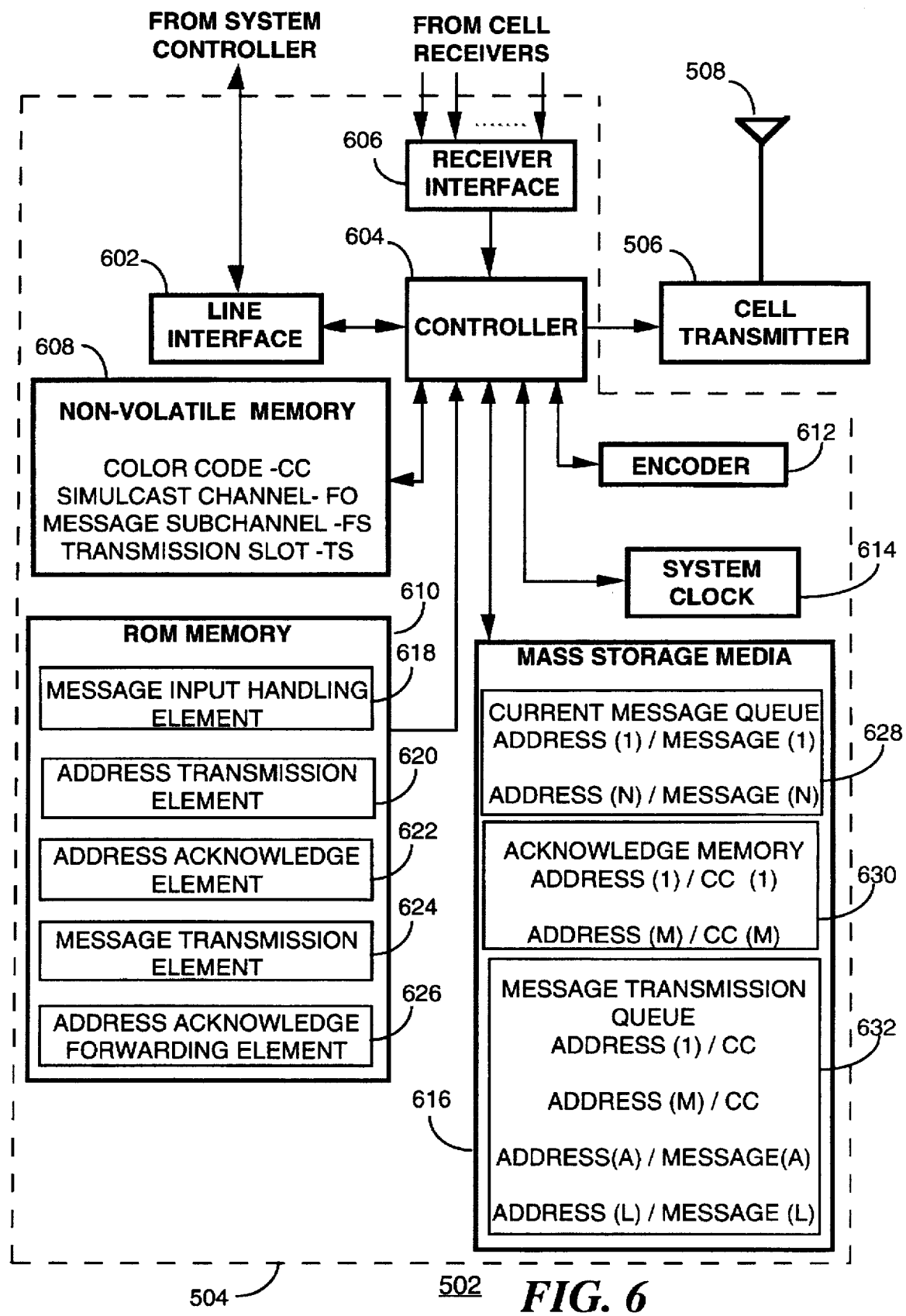
FIG. 6 is an electrical block diagram of a transmitter utilized in the communication system of FIG. 5 in accordance with the present invention.

FIG. 6 is an electrical block diagram of a base station 502 utilized in the communication system of FIG. 5 in accordance with the present invention. The base station 502 includes the cell controller 504, the cell transmitter 506 and antenna 508 as described above. The cell controller 504 includes a line interface 602, a controller 604, a receiver interface 606, a non-volatile memory 608, a read only memory 610, an encoder 612, a system clock 614 and a mass storage media 616. The line interface 602 couples the cell controller 504 to the system controller 500 via the message distribution system 514 described above. The line interface 602 provides an output which is coupled to an input of the controller 604. The controller 604 controls the processing of message information distributed from the system controller 500. The controller 604 is preferably implemented using a microcomputer such as a MC68XXX series microcomputer or a digital signal processor such as a DSP56000 digital signal processor manufactured by Motorola Inc. of Schaumburg, Ill., and can also be implemented using a personal computer or workstation as well. The receiver interface 606 couples the cell controller 504 to the one or more cell receivers 512 which are located within the geographic transmission area of the base station 502. The output of the receiver interface 606 is coupled to an input of the controller 604 which also controls the processing of addresses and associated color codes received from the cell receivers 512, as will be described in further detail below.

The non-volatile memory 608 is coupled to the controller 604 and stores information necessary for the operation of the cell transmitter 506 and for the processing of the message information distributed from the system controller 500. The non-volatile memory 608 stores such information as a color code (CC) assigned to the base station 502, the frequency (FO) of the outbound transmission channel used for simulcast transmission, the message sub channel frequency (FS) when a frequency other than the simulcast frequency (FO) is utilized for non-simulcast message transmission, and the transmission slot (TS) which is assigned to the base station 502 for the non-simulcast delivery of the messages to the communication transceiver 510. The non-volatile memory 608 can be integrated as a part of the microcomputer or digital signal processor or can be an external memory device implemented using any of a number of well known non-volatile memory devices, such as electrically erasable programmable read only (EEPROM) memory, "flash" memory, electrically programmable read only (EPROM) memory and other well known non-volatile memory devices.

The read only memory (ROM) 610 can be integrated as a part of the microcomputer or digital signal processor or can be implemented using an external memory device as described above. The read only memory (ROM) 610 stores firmware routines necessary for controlling the operation of the base station 502 as will be described in further detail below. The firmware routines preferably programmed within the read only memory 610 include, but are not limited to, a message input handling element 618 which controls the reception and temporary storage of addresses and associated messages distributed by the system controller 500; an address transmission element 620 which controls queuing and transmission of addresses and color codes for simulcast transmission; an address acknowledgment element 622 which controls reception and temporary storage of acknowledge back responses forwarded from the one or more cell receivers 512; a message transmission element 624 which controls the transmission of addresses and color codes during the control frame 108, controls the identification of addresses flagged by the color code assigned to the base station and recovery of the messages associated therewith, and further controls the non-simulcast transmission of the addresses and messages to the communication transceivers 510 which were located within the transmission zone of the base station; and an address acknowledge forwarding element 626 which controls the processing of acknowledge back responses received by the cell receivers 512 for transmission back to the system controller 500 as will be described in detail below.

The encoder 612 is coupled to the controller 604 and is responsive to the message transmission element 624 for encoding the address and the color code in the communication protocol utilized for transmission of the acknowledge back response. The system clock 614 is coupled to the controller 604 and provides the timing signals utilized by the controller 604 for controlling the reception of the address, color code and message signals during the outbound message transmissions, and also for controlling the transmission of the acknowledge back responses during the inbound message transmissions.

The mass storage media 616 provides temporary storage of address and associated message information distributed by the system controller 500. The mass storage media 616 is implemented using random access memory, a hard disk drive or other well known mass storage devices. The mass storage media 616 provides several message queues, a current message queue 628, an acknowledge memory 630 and a message transmission queue 632. The current message queue 628 stores the addresses and associated messages distributed from the system controller 500 on a batch basis. The acknowledge memory 630 stores all addresses and associated color codes received by the one or more cell receivers. The message transmission queue 632 stores the addresses and associated color code to be transmitted during the control frame 108, and further stores the addresses and associated messages to be transmitted during the assigned non-simulcast message transmission frames 110.

Figure 7:
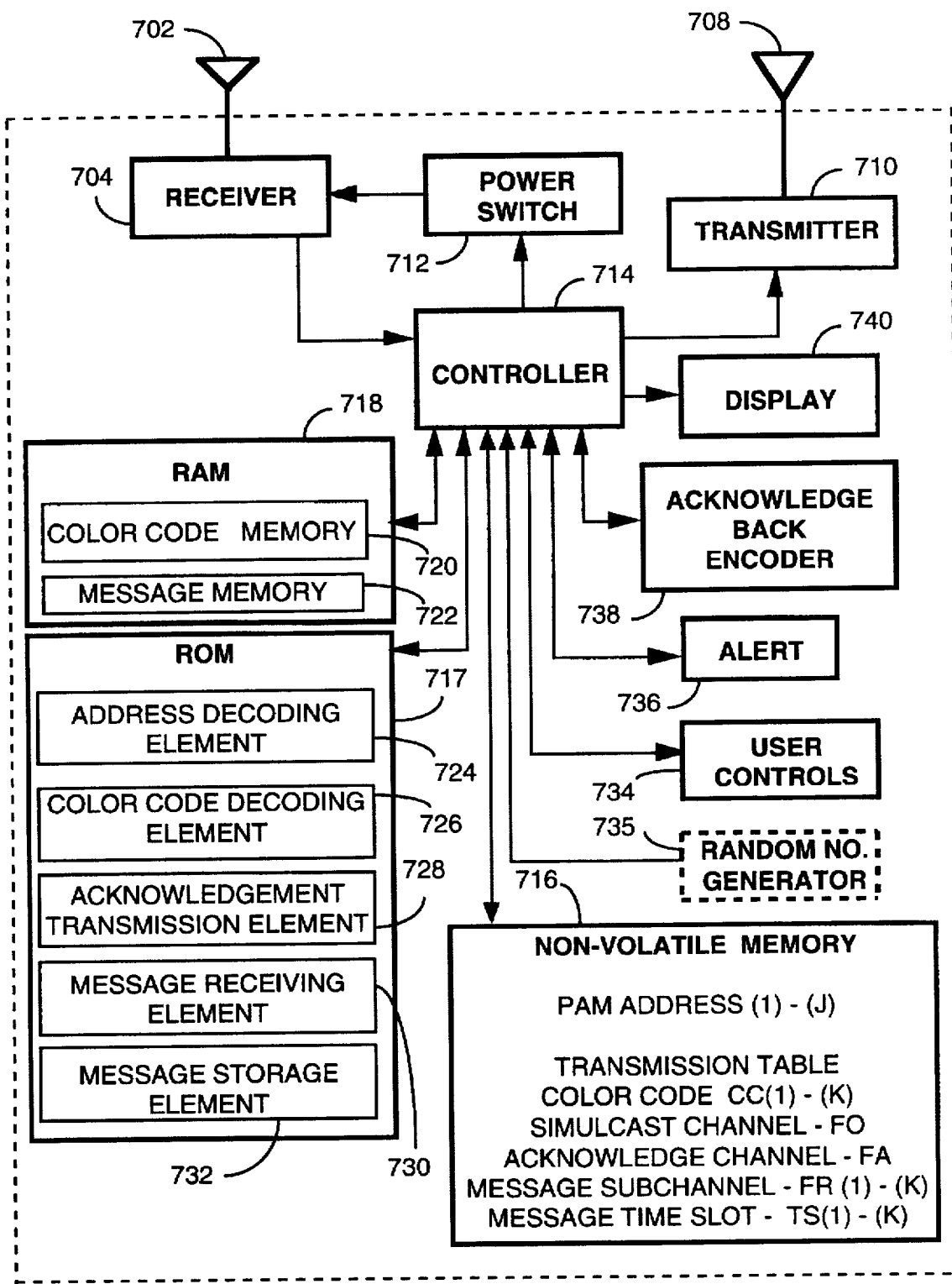
FIG. 7 is an electrical block diagram of a communication transceiver utilized in the communication system of FIG. 5 in accordance with the present invention.

FIG. 7 is an electrical block diagram of a communication transceiver 510 utilized in the communication system 100 of FIG. 5 in accordance with the present invention. The communication transceiver 510 comprises a receiver antenna 702 and transmitter antenna 708 for intercepting RF signals from the base stations 502 and for transmitting RF signals to the base stations 502, respectfully. The receiver antenna 702 is coupled to a conventional receiver 704 for demodulating the RF signals received from the base stations 502. The receiver 704 is also coupled to a frequency synthesizer 706 which is well known by one of ordinary skill in the art and which receives programming instruction from a controller 714. The frequency synthesizer 706 is utilized for controlling demodulation of multiple carrier frequencies for outbound and inbound channels utilizing FDM. It will be appreciated that, alternatively, for a communication system 100 utilizing the TDD protocol of FIG. 2 the frequency synthesizer 706 can be replaced with a fixed oscillator. The transmitter antenna 708 is coupled to a transmitter 710 which is well known by one of ordinary skill in the art for modulating RF signals transmitted to the base stations 502.

The RF signals received from the base stations 502 use conventional two and four-level FSK. The RF signals transmitted by the communication transceiver 510 to the base stations 502 use four-level FSK. Radio signals received by the receiver 704 produce demodulated information at the output. The demodulated information is coupled to the input of the controller 714, which is utilized as a decoder for decoding outbound messages. During inbound signaling, acknowledgment messages are processed by the controller 714 and delivered to the transmitter 710 for transmission. A conventional power switch 712 is coupled to the controller 714 and is used to control the supply of power to the transmitter 710 and receiver 704, thereby providing a battery saving function.

To perform the necessary functions of the communication transceiver 510, the controller 714 preferably includes a microprocessor, a RAM 718, a ROM 717, and a non-volatile memory 716. Preferably, the microprocessor is similar to the DSP56XXX digital signal processor (DSP) family manufactured by Motorola, Inc. It will be appreciated that other similar processors can be utilized for the microprocessor, and that additional processors of the same or alternative type can be added as required to handle the processing requirements of the controller 714. It will be appreciated that other types of memory, e.g., EEPROM or FLASH, can be utilized for the ROM 717, as well as the RAM 718. It will be further appreciated that the RAM 718 and the ROM 717, singly or in combination, can be integrated as a contiguous portion of the microprocessor.

The non-volatile memory 716 includes information such as one or more addresses which are utilized by the communication protocol for identifying the communication transceiver 510, and a transmission table. The transmission table includes a list of valid color codes (K) and list of valid simulcast frequencies (FO) utilized by the communication system 100. For inbound communication the transmission table includes a list of acknowledgment channel frequencies (FA) and associated message subchannel frequencies (FR), and the time slots available on the inbound channel. FA and FR are preferably utilized by a communication system employing frequency division duplex (FDM). The non-volatile memory can be an EEPROM or flash device external or integral part of the controller 714. When an EEPROM is provided, the transmission table can be updated or changed via an over-the-air transmission in a manner well known in the art.

The RAM 718 includes a color code memory 720, and a message memory 722. The color code memory 720 is used for storing color codes decoded by the controller 714. The message memory 722 is utilized for storing successfully decoded messages originating from the base stations 502.

The ROM 717 includes firmware utilized by the controller 714 for processing outbound and inbound messages. The firmware comprises an address decoding element 724, a color code decoding element 726, an acknowledgment transmission element 728, and a message receiving element 730, and a message storage element 732. During outbound message processing, the controller 714 calls on the message receiving element 730 for sampling the demodulated signal generated by the receiver 704 converting the demodulated signal to demodulated data. The controller 714 then calls on the address decoding element 724 and the color code decoding element 726 for decoding the address and color code received on the outbound channel, respectively. The controller 714 then compares the decoded address with one or more addresses stored in the EEPROM, and when a match is detected, the controller 714 calls on the message storage element 732 to process the remaining portion of the message. The message storage element 732 performs the function of a memory manager to efficiently utilize message memory.

Once the controller 714 has processed the message, a call alerting signal is generated to alert a user that a message has been received. The call alerting signal is directed to a conventional audible or tactile alerting device 736 for generating an audible or tactile call alerting signal. In addition, the controller 714 is programmed to send an acknowledge back response, ACK indicating a successful message reception or a NACK, indicating an unsuccessful message reception, depending on the quality of the received message. To send the ACK or NACK (acknowledge back response), the controller 714 calls on the acknowledgment transmission element 728 to process an acknowledgment message to the base stations 502 acknowledging successful, or unsuccessful, reception of the message. The acknowledgment transmission element 728 controls the transmitter 710 which modulates FSK data corresponding to the acknowledgment message which in the preferred embodiment of the present invention is the transceiver address and transmitter color code.

The stored message can be accessed by the user through user controls 734, which provide functions such as lock, unlock, delete, read, etc. More specifically, by the use of appropriate functions provided by the user controls 734, the message is recovered from the RAM 718, and then displayed on a display 740, e.g., a conventional liquid crystal display (LCD), or played out audibly, in the case of a voice message, by the combination of an audio amplifier and a speaker (not shown).

Figure 8:
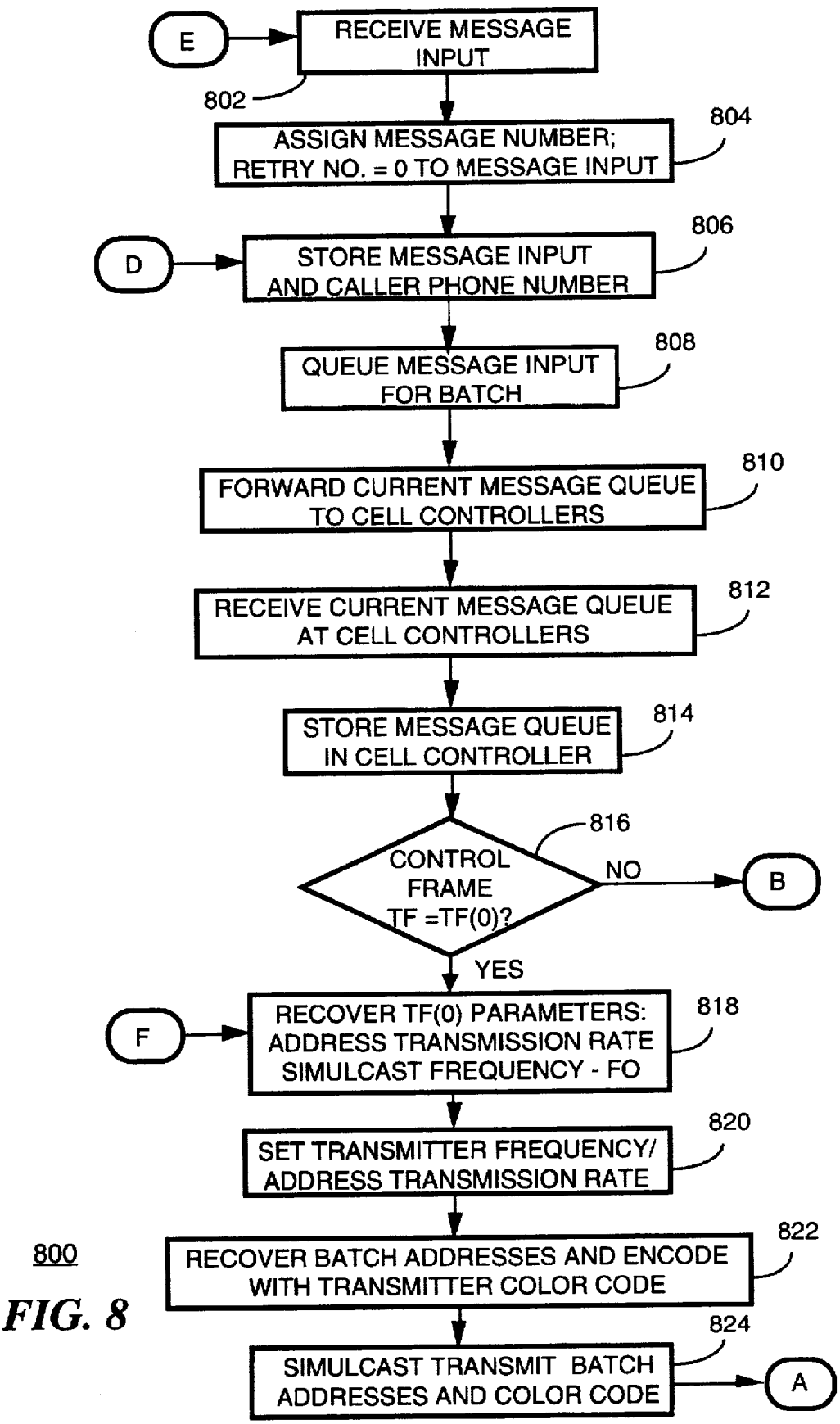
FIGS. 8–12 are flow charts illustrating the operation of the communication system of FIG. 5 in accordance with the present invention.

FIGS. 8-12 are flow charts illustrating the operation of the communication system of FIG. 5 in accordance with the present invention. Referring first to FIG. 8, as a message input is received at step 802 the caller's phone number is identified by the system controller 500. The system controller 500 identifies the communication transceiver 510 to which the message is intended from a subscriber list as is well known to one of ordinary skill in the art and assigns an address and a message number to the message and a retry number is set to zero at step 804. The address, message, message number, retry number and the caller's phone number are then stored in an active page file at step 806, from which the information will be extracted as will be described below. The system controller 500 then recovers the addresses of communication transceivers 510 for which messages are intended and queues the addresses and associated messages into a batch at step 808. Once the batch queue has been constructed, the system controller 500 forwards the current message queue to the cell controllers 504 at step 810. In step 812 the cell controllers 504 receive the current message queue and then store the current message queue at step 814 in the mass storage media 616. The cell controller 504 then checks if the control frame (i.e., transmission frame 0) is scheduled at step 816. When the control frame is not scheduled, then the cell controller 504 proceeds to step 848 of FIG. 10, as will be described in detail below.

When the control frame is scheduled, at step 816, the cell controller 504 recovers the transmission parameters which include the address transmission rate and the simulcast transmission frequency, at step 818. The cell controller 504 then sets the frequency of the cell transmitter 506 and the address transmission rate, at step 820. The cell controller 504 then recovers batch addresses and encodes the batch addresses with the transmitter color code, at step 822. The batch addresses and color codes are then simulcast transmitted by the cell transmitters 506 at step 824.

Figure 9:
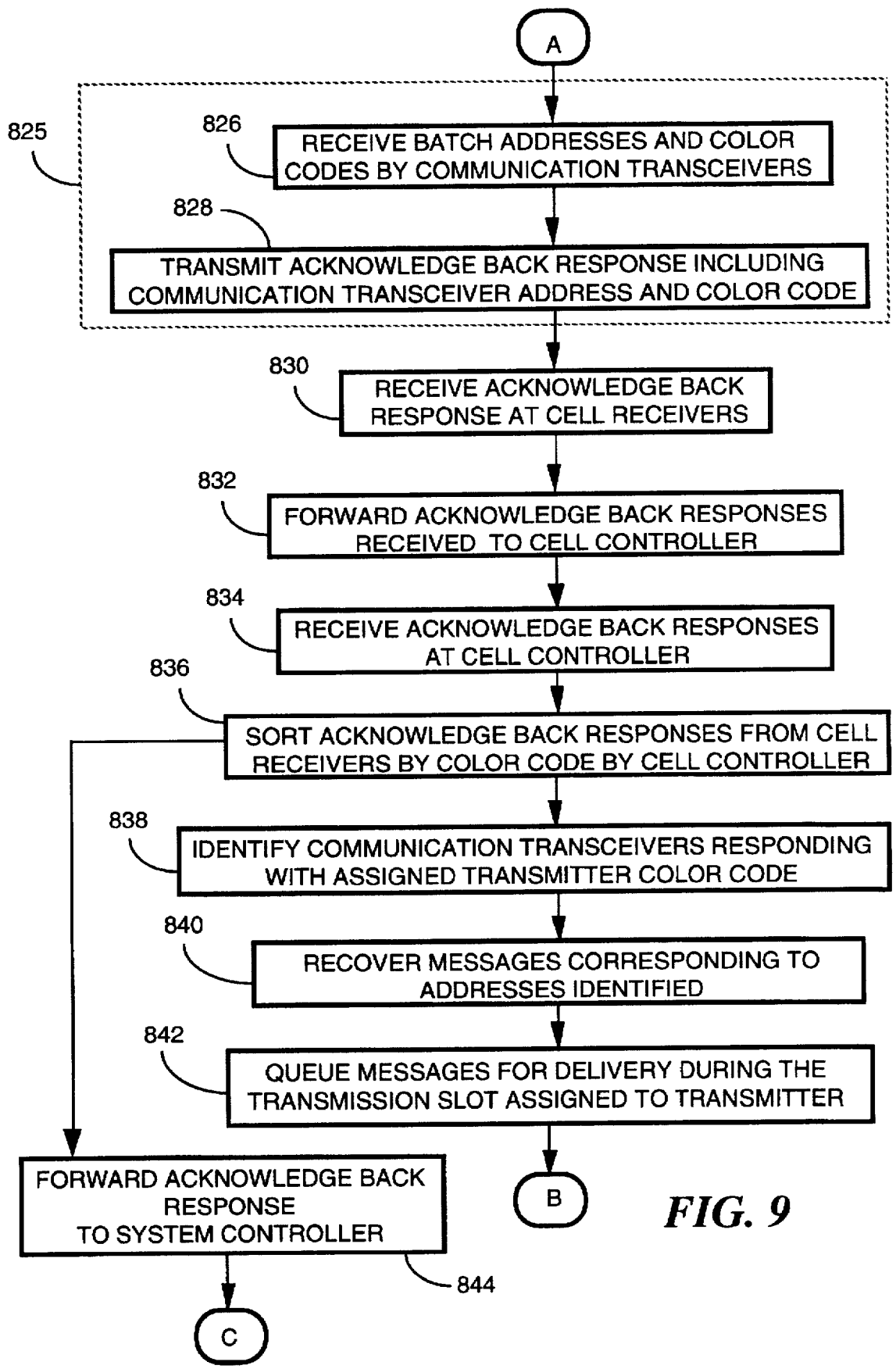

Continuing with FIG. 9, in step 825, which includes step 826 and step 828, the communication transceiver 510 receives the batch addresses and color codes, at step 826, and for the communication transceiver 510 for which the address matches the PAM assigned, the communication transceiver transmits an acknowledge back response including the communication transceiver address and color code, at step 828. The acknowledge back response is utilized by the cell controller 504 and system controller 500 for identifying the location of the communication transceiver 510, as will be described in further detail below. The cell receivers 512 receive the acknowledge back messages transmitted by the communication transceivers 510, at step 830. The messages received by the cell receivers 512 are then forwarded to the cell controller 504 at step 832 at which time the messages are received by the cell controller, at step 834. In step 836 the cell controller 504 sorts the acknowledge back responses received from the cell receivers 512 by color code. The sorted acknowledge back responses are then forwarded to the system controller 500, at step 844, which then process the acknowledge back responses as will be described below.

The acknowledge back responses, after sorting and deleting duplicate responses at step 836, are used by the cell controller 504 to identify the communication transceivers 510 which responded with the transmitter color code assigned to the geographic region, at step 838. The cell controller 504 then recovers the messages corresponding to the addresses identified, at step 840, and then queues the messages for delivery during the transmission frame assigned to the communication transceivers 510, at step 842.

Figure 10:
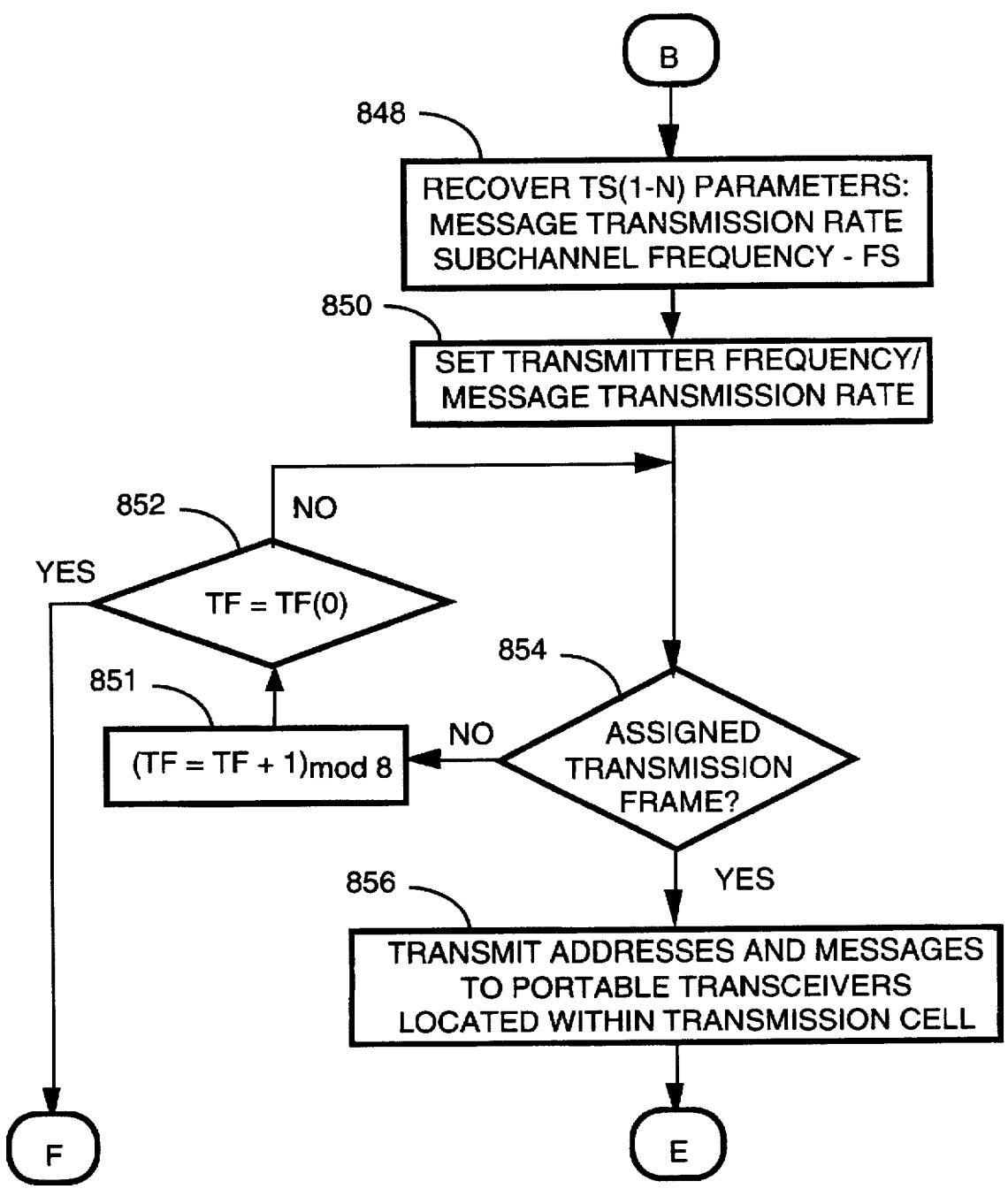

Continuing with FIG. 10, the cell controller 504 recovers transmission frame parameters such as message transmission rate, and subchannel frequency from the non-volatile memory 608, at step 848. The cell controller 504 then proceeds to set the transmitter frequency and message transmission rate of the cell transmitter 506, at step 850. In step 854, the cell controller 504 checks whether the transmission frame assigned to messages is scheduled. When the assigned transmission frame is scheduled, the cell controller 504 instructs the cell transmitter 506 to transmit, at step 856, the addresse(s) and message(s) stored in the current message queue to the communication transceivers 510 located within the transmission cells. Once the address and message transmission is complete, the communication system 100 proceeds back to step 802 of FIG. 8 where the system controller 500 checks for subsequent messages from callers.

Returning to FIG. 10, when the scheduled transmission frame is not assigned for address and message transmission, at step 854, the cell controller 504 increments a transmission frame counter (utilizing modulo 8 addition), at step 851. The cell controller 504 then continues to check whether the transmission frame scheduled is assigned, at step 852. When the next transmission frame scheduled is transmission frame 0 108 (i.e., the control frame), then the cell controller 504 proceeds to step 818 of FIG. 8, as described above.

Figure 11:
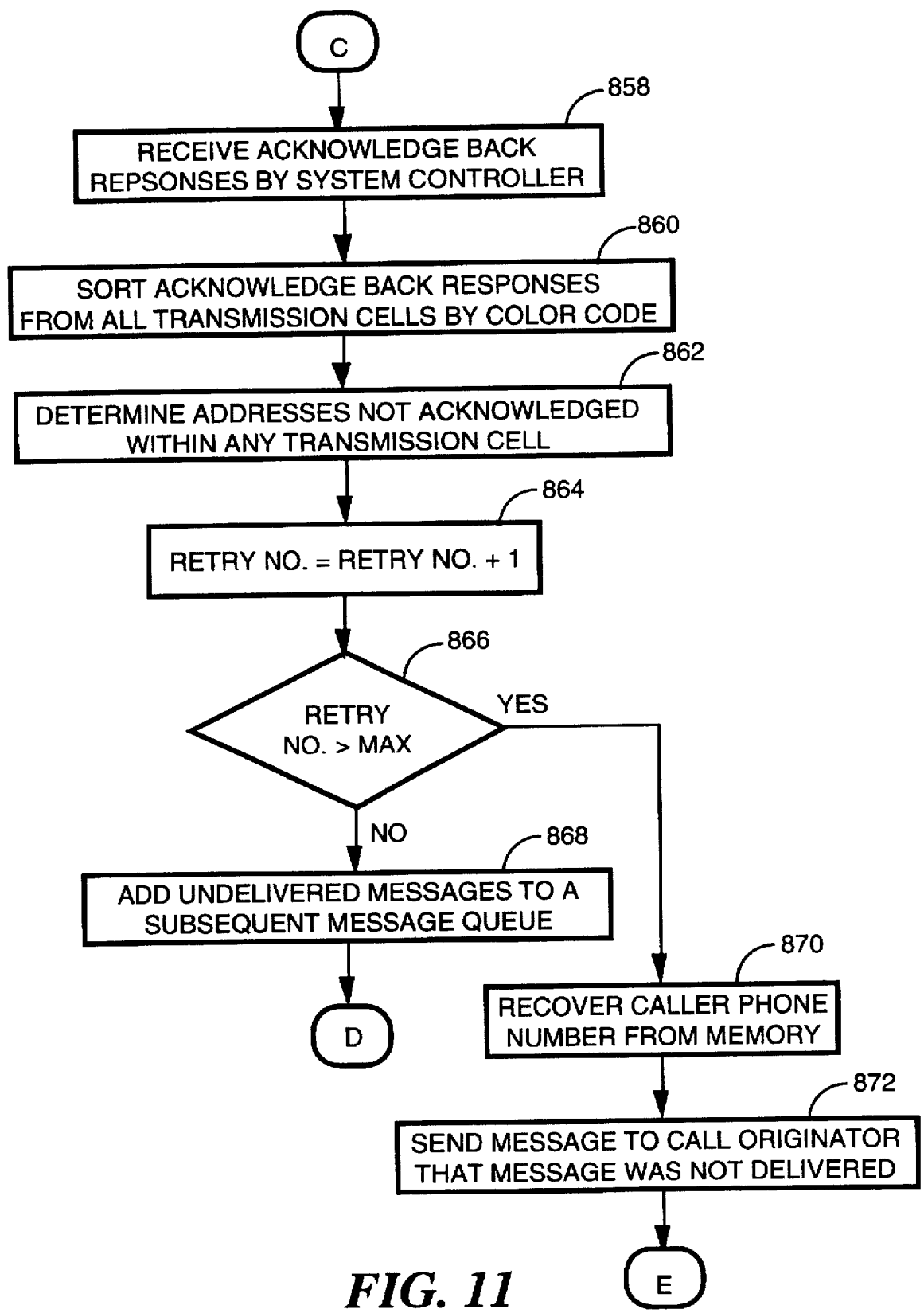

Continuing with FIG. 11, the system controller 500 receives the acknowledge back responses, at step 858, and sorts the acknowledge back responses by color code, deleting any duplicate responses at step 860, to determine the location of all communication transceivers 510 within the communication system. The system controller 500 then determines the addresses of communication transceivers which have not acknowledged, at step 862. In step 864, a retry counter is incremented for each address not acknowledged. When the retry count has exceeded a predetermined retry count, at step 866, and the message has not been acknowledged, the system controller 500 can optionally recover the caller's phone number, at step 870, and send a message to the caller, at step 872, that the message was not delivered, and proceeds back to step 802 of FIG. 8 for receiving subsequent messages. When the retry count has not been exceeded, at step 866, the messages corresponding to unsuccessful acknowledge back responses are added to a subsequent message queue, at step 868 for re-transmission at step 806 of FIG. 8, as described above.

Figure 12:
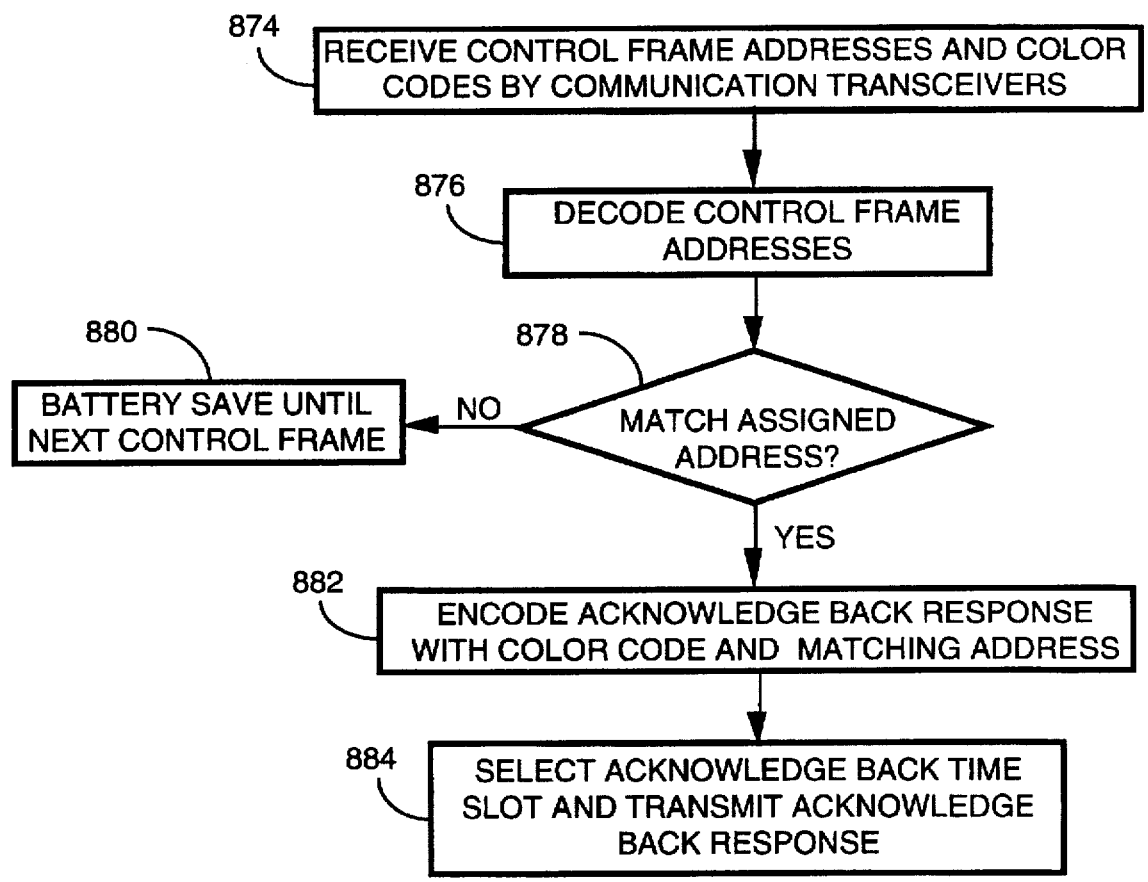

Continuing with FIG. 12, the steps illustrated elaborate in further detail step 825 shown in FIG. 9. The communication transceiver 510 receives the control frame addresses and color codes transmitted by the base stations 502, at step 874. The communication transceiver 510 then proceeds to decode the control frame addresses, at step 876, as described above. In step 878, the communication transceiver 510 checks for a match with the assigned address which is the addresses stored in the EEPROM. When a match is not detected, at step 878, the communication transceiver 510 switches to a battery save mode, at step 880 until the next control frame. When a match is detected, at step 878, the communication transceiver 510 encodes the acknowledge back response with the color code and address received on the outbound channel, at step 882. In step 884, the communication transceiver 510 selects the acknowledge back transmission frame in accordance with the information stored in the EEPROM, as described above. The communication transceiver 510 then proceeds to step 886 where the acknowledge back response is transmitted to the cell receiver 512.

Thus, it should be apparent by now that the present invention provides a communication system 100 and method utilized by the communication system 100 for minimizing the transmission delay encountered in delivering messages to communication transceivers 510 within the transmission cells of a simulcast communication system in which the communication transceivers 510 were located. In particular, the communication system 100 minimizes the transmission delay encountered when delivering messages to communication transceivers 510 through the use of frequency re-use, as described above. Furthermore, the communication system 100 can minimize the transmission delay encountered in delivering the messages to communication transceivers 510 by using a multiplicity of frequency re-use channels coordinated with scheduled message transmission frames thereby maximizing the battery life of the communication transceivers 510.

What is claimed is:

1. A method for providing minimum transmission delay for delivery of a message in a communication system which comprises a plurality of transmission cells which include one or more cell receivers and a cell transmitter and which define geographical transmission areas, the method comprising the steps of:

transmitting, during a first scheduled time interval, from the cell transmitter located within the plurality of transmission cells, an address identifying a communication transceiver for which a message is intended and a color code signal identifying the cell transmitter;

receiving, during a second scheduled time interval, by at least one of said one or more cell receivers located within the plurality of transmission cells, an acknowledgment signal generated by the communication transceiver for which a message is intended, the acknowledgment signal including the color code signal identifying the cell transmitter transmitting the address;

transmitting, from the cell transmitter identified by the color code signal, during a third time interval including a predetermined sequence of scheduled message transmission frames, the address identifying the communication transceiver for which a message is intended and the message during a selected one of the predetermined sequence of scheduled message transmission frames designated by the color code signal; and receiving, by the communication transceiver, during the selected one of the predetermined sequence of scheduled message transmission frames, the address identifying the communication transceiver for which the message is intended and the message transmitted by the cell transmitter identified.

2. A communication system providing minimum transmission delay for delivery of a message, the communication system comprising:

a plurality of transmission cells which include one or more cell receivers and a cell transmitter and which define geographical transmission areas;

said cell transmitter located within each of said plurality of transmission cells, transmitting during a first scheduled transmission time interval an address identifying a communication transceiver for which a message is intended and a color code signal identifying said cell transmitter;

said communication transceiver being responsive to the address and the color code signal being received during the first scheduled transmission time interval, for generating and transmitting during a second scheduled transmission time interval an acknowledgment signal including the address and the color code signal identifying the cell transmitter;

at least one of said one or more cell receivers located within said plurality of transmission cells receiving during the second scheduled transmission time interval the acknowledgment signal generated by said communication transceiver for which the message is intended, the acknowledgment signal including the color code signal identifying said cell transmitter transmitting the address;

said cell transmitter identified by the color code signal further transmitting, during a third time interval including a predetermined sequence of scheduled message transmission frames, the address identifying said communication transceiver for which the message is intended and the message during one of the predetermined sequence of scheduled message transmission frames designated by the color code signal; and said communication transceiver further receiving the address identifying said communication transceiver for which the message is intended and the message transmitted by said cell transmitter during the one of the predetermined sequence of scheduled message transmission frames designated by the color code signal.

3. The communication system according to claim 2, wherein the transmission during the first scheduled transmission time interval is a simulcast transmission generated throughout the plurality of transmission cells.

4. The communication system according to claim 3, wherein the address is transmitted at a first data bit rate during the simulcast transmission.

5. The communication system according to claim 4, wherein the transmission during the one of the plurality of scheduled message transmission frames designated by the color code signal is a non-simulcast transmission generated within the transmission cell in which said communication transceiver is located.

6. The communication system according to claim 5, wherein the address and message are transmitted at a second data bit rate during the non-simulcast transmission, wherein the second data bit rate is greater than the first data bit rate.

7. The communication system according to claim 2, wherein the plurality of scheduled message transmission frames correspond to a predetermined sequence of transmission time intervals.

8. The communication system according to claim 2, wherein the plurality of scheduled message transmission frames correspond to a predetermined sequence of transmission frequencies.

9. The communication system according to claim 2, wherein transmission of the address during the first scheduled transmission time interval occurs on a first operating frequency.

10. The communication system according to claim 9, wherein transmission of the acknowledgment signal during the second scheduled transmission time interval occurs on a second operating frequency different than the first operating frequency.

11. The communication system according to claim 2, wherein transmission of the acknowledgment signal during the second scheduled transmission time interval occurs on a first operating frequency.

12. The communication system according to claim 2, further comprising:

a cell controller, coupled to said cell transmitter, for controlling transmission of the address during the first scheduled transmission time interval and further for controlling the transmission of the address and a message corresponding thereto during the one of a plurality of scheduled message transmission frames designated by a color code signal; and a system controller, coupled to said cell controller located within each of said plurality of transmission cells, for receiving the message intended for said communication transceiver, and further for distributing the message received to said cell controller.

13. The communication system according to claim 12, wherein said cell controller comprises:

a first memory for storing the color code signal identifying the cell transmitter and a predetermined transmission frame corresponding to the one of the plurality of scheduled message transmission frames designated by the color code signal identifying the cell transmitter; and a second memory for storing the address and the message corresponding thereto.

14. The communication system according to claim 13, wherein said second memory further stores the acknowledgment signal received, and wherein said cell controller further comprises a means for comparing the acknowledgment signal stored in said second memory with the color code signal stored in said first memory, and in response to the acknowledgment signal stored being the same as the color code signal stored, for effecting the transmission of the address and the message corresponding thereto during the predetermined transmission frame.

15. The communication system according to claim 12 wherein said system controller comprises:

a first memory for storing a table of predetermined color code signals and scheduled message transmission frames associated therewith; and a second memory for storing the address and the message corresponding thereto which are distributed from said system controller to said cell controller.

16. The communication system according to claim 15 wherein said cell controller comprises means for transmitting the address, color code signal and acknowledgment signal to said system controller, and wherein said system controller further comprises means for comparing the acknowledgment signal received from said cell controller with a table of color code signals stored in said first memory, and in response to the acknowledgment signal which is received being the same as one of the table of color code signals stored, said system controller effecting the transmission of the address and the message corresponding thereto to a cell controller designated by the color code signal received from said cell controller.

17. A communication transceiver for use in a communication system providing minimum transmission delay for delivery of a message, said communication transceiver comprising:

a receiver for receiving during a first scheduled transmission time interval an address identifying a communication transceiver for which a message is intended, and a color code signal identifying a cell transmitter transmitting the message;

a transmitter, for transmitting during a second scheduled transmission time interval an acknowledgment signal including the address identifying the communication transceiver for which a message is intended, and the color code signal received identifying the cell transmitter;

a memory for storing a table of predetermined color code signals and scheduled message transmission frames associated therewith; and a controller responsive to the color code signal received for selecting from said table of predetermined color code signals a transmission frame associated with the color code signal received, wherein said receiver is further responsive to said controller for receiving the address identifying the communication transceiver to which a message is intended and message during the transmission frame associated with the color code signal received.

18. The communication transceiver according to claim 17 further comprising:

a decoder for decoding the address identifying a communication transceiver for which a message is intended, and for generating in response thereto a control signal; and an encoder, responsive to the control signal, for encoding the address of the communication transceiver for which the message is intended and the color code signal identifying the cell transmitter transmitting the message as an acknowledgment signal.

19. The communication transceiver according to claim 17, wherein said memory further stores a table of predetermined transmission parameters further associated with the predetermined color code signals.

20. The communication transceiver according to claim 19, wherein said table of predetermined transmission parameters includes a table of alternate operating frequencies assigned to cell transmitters having a same color code signal.

21. A method for transmitting messages to a communication transceiver operating within a communication system which comprises a plurality of transmission cells which define geographical transmission areas and which include a transmitter assigned a transmitter ID identifying the transmitter and one or more receivers for receiving an acknowledgment signal generated by the communication transceiver, said method comprising the steps of:

transmitting, during a first scheduled transmission time interval, within the plurality of transmission cells, an address identifying the communication transceiver for which a message is intended, and the transmitter ID identifying the transmitter transmitting the address;

receiving, by the communication transceiver, the address and the transmitter ID of the transmitter transmitting the address, and in response thereto transmitting the acknowledgment signal including the address of the communication transceiver and the transmitter ID received during a second scheduled transmission time interval;

selecting, from a table of predetermined transmitter IDs and associated predetermined scheduled message transmission frames stored within the communication transceiver;

receiving the acknowledgment signal by at least one of the one or more receivers located within one or more of the plurality of transmission cells during the second scheduled transmission time interval;

comparing the transmitter ID received with a table of predetermined transmitter IDs identifying the transmitter and identifying therefrom the transmitter from which the address was transmitted;

transmitting from the transmitter identified, during a third time interval including a predetermined sequence of scheduled message transmission frames, the address and the message during a selected one of the predetermined sequence of scheduled message transmission frames associated with the transmitter ID received; and receiving, by the communication transceiver, the address and message which is transmitted during the selected one of the predetermined sequence of scheduled message transmission frames.

\* \* \* \* \*